(12) United States Patent
Merrell et al.

(10) Patent No.: US 9,396,380 B2
(45) Date of Patent: Jul. 19, 2016

(54) FINGER PRINT SENSOR AND AUXILIARY PROCESSOR INTEGRATION IN AN ELECTRONIC DEVICE

(71) Applicant: GOOGLE TECHNOLOGY HOLDINGS LLC, Mountain View, CA (US)

(72) Inventors: Thomas Y Merrell, Beach Park, IL (US); Steven M. Knapp, Grayslake, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/959,866

(22) Filed: Dec. 4, 2015

(65) Prior Publication Data

US 2016/0086010 A1   Mar. 24, 2016

Related U.S. Application Data

(63) Continuation of application No. 14/444,205, filed on Jul. 28, 2014, now Pat. No. 9,230,150.

(51) Int. Cl.
 *G06K 9/00* (2006.01)
(52) U.S. Cl.
 CPC .......... *G06K 9/0002* (2013.01); *G06K 9/00067* (2013.01); *G06K 9/00087* (2013.01)
(58) Field of Classification Search
 USPC ......... 382/115, 116, 124, 209, 278; 340/5.53, 340/5.81, 5.82, 5.83
 See application file for complete search history.

(56) References Cited

U.S. PATENT DOCUMENTS

| | | | | |
|---|---|---|---|---|
| 7,337,326 B2* | 2/2008 | Palmer | ................. | G06Q 20/327 713/186 |
| 7,979,716 B2* | 7/2011 | Fiske | ...................... | G06F 21/32 711/164 |
| 8,103,881 B2* | 1/2012 | Doughty | .............. | G06Q 20/327 257/678 |
| 8,231,056 B2* | 7/2012 | Zabroda | ............. | G06K 9/00053 235/454 |
| 8,249,557 B2 | 8/2012 | Xiao et al. | | |
| 8,311,514 B2* | 11/2012 | Bandyopadhyay | ... | G06F 1/1643 455/410 |
| 8,315,444 B2 | 11/2012 | Gardner et al. | | |

(Continued)

OTHER PUBLICATIONS

Thomas, et al., ""Finger Print State Integration with Non-Application Processor Functions for Power Savings in an Electronic Device"", Jun. 20, 2014.

*Primary Examiner* — Yosef Kassa

(74) *Attorney, Agent, or Firm* — Morris & Kamlay LLP

(57) ABSTRACT

A system includes a fingerprint sensor and an auxiliary processor. The auxiliary processor is operable to arm the fingerprint sensor prior to the auxiliary processor entering a low power or sleep mode. The fingerprint sensor can detect a finger proximately located with the fingerprint sensor, capture and store fingerprint data from the finger, perform at least one pre-processing step after capturing the fingerprint data from the finger while the auxiliary processor is in the low power or sleep mode, and after the at least one pre-processing step and upon receiving a request from the auxiliary processor for the finger print data deliver the fingerprint data to the auxiliary processor. The auxiliary processor can compare the fingerprint data to reference data and determine whether the fingerprint data substantially matches the reference data.

20 Claims, 8 Drawing Sheets

(56) References Cited

U.S. PATENT DOCUMENTS 8,340,658 B2 * 12/2012 Tsui .................. H02J 7/0055
                                                          455/352
8,693,736 B2  4/2014 Benkley et al.
8,805,865 B2  8/2014 Samari et al.
8,811,688 B2  8/2014 Benkley et al.

* cited by examiner

| ACTIVITY | GPIO0 | GPIO1 |
|---|---|---|
| FPS IDLE | FPS (INPUT) PROS (INPUT) | FPS (INPUT) PROS (I/O) |
| FPS AUTHENTICATING/ACQUIRING | FPS (INPUT) PROS (INPUT) | FPS (INPUT) PROS (I/O) |
| FPS AUTHENTICATED/ACQUIRED | FPS (INPUT) PROS (INPUT) | FPS (OUTPUT) PROS (I/O) |
| FPS TIMER EXPIRED | FPS (INPUT) PROS (INPUT) | FPS (INPUT) PROS (I/O) |

| STATE (OUTPUT FROM FPS) | GPIO0 | GPIO1 |
|---|---|---|
| FPS CAPTURING/CAPTURED | N/A | 0 |
| FPS IDLE/ACQUIRING/AUTHENTICATING | N/A | 1 |
| FPS CAPTURING/CAPTURED | N/A | 0 |
| FPS IDLE/ACQUIRING/AUTHENTICATING | N/A | 1 |

| STATE (INPUT TO FPS) | GPIO0 | GPIO1 |
|---|---|---|
| RUN SEMI-AUTONOMOUS LOOP (FIG. 4) | 0 | 0 |
| HALT | N/A | 1 |
| DELETE/CAPTURE | 1 | 0 |
| DELETE/CAPTURE | N/A | 1 |

*FIG. 8*

FINGER PRINT SENSOR AND AUXILIARY PROCESSOR INTEGRATION IN AN ELECTRONIC DEVICE

BACKGROUND

1. Technical Field

This disclosure relates generally to electronic devices, and more particularly to electronic devices with biometric sensors.

2. Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications, text messaging, Internet browsing, commerce such as banking, and social networking. The circumstances under which users of mobile communication device use their devices varies widely as well.

In using mobile communication devices for so many applications, a user is likely to have a wide variety of personal passcodes that are used to access the device, an application, or combinations thereof. Such passcodes are generally required to access personal information on an electronic device, access email, retrieve bank records, and so forth. Frequently these passcodes are required to meet strict security guidelines and can thus become lengthy and difficult to remember. Moreover, for security purposes, many devices and systems require the user to change each passcode on a regular basis. Accordingly, remembering all these passcodes can be difficult.

To alleviate this issue, some modern electronic devices are being equipped with biometric sensors. Rather than entering a passcode, a user touches or otherwise interacts with a biometric sensor to identify their identity and acquire access to a device or particular application. While biometric sensors may eliminate the need to memorize many different passcodes, they are not without issues of their own. For example, they can be slow. For example, comparing a retinal scan or a fingerprint to a reference to determine whether there is a match takes a large amount of processing power and can be slow. It would be advantageous to have an improved system for accessing an electronic device, personal information, or applications operating on an electronic device.

BRIEF DESCRIPTION OF THE DRAWINGS

FIG. 8 illustrates explanatory state tables in accordance with one or more embodiments of the disclosure.

Figure 1:
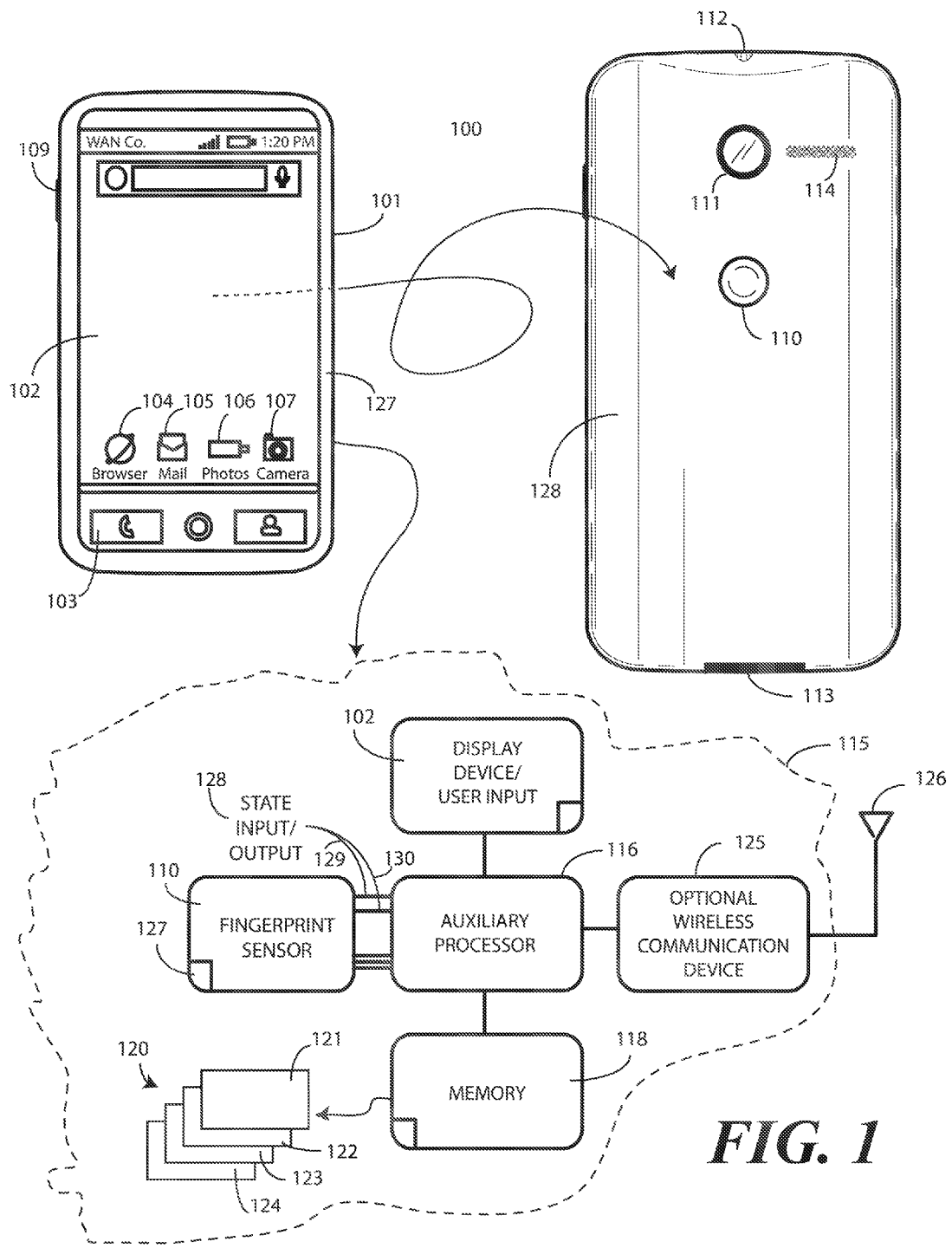
FIG. 1 illustrates one explanatory system configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to processing information received from a fingerprint sensor using one or more processors as described below. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of fingerprint data processing as described herein. The non-processor circuits may include, but are not limited to, a radio receiver, a radio transmitter, signal drivers, clock circuits, power source circuits, and user input devices. As such, these functions may be interpreted as steps of a method to perform processing of fingerprint data. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a system that includes a fingerprint sensor and one or more processors. For discussion purposes, the one or more processors will be referred to as an auxiliary processor. However, it should be noted that the auxiliary processor can be any of an application processor, a secondary processor, or combinations thereof. An "application" processor is configured to operate the primary applications of the system, including the operating system environment. A "secondary" processor can be configured to operate ancillary or secondary functions, including output notification devices, user interface functions, and so forth.

The secondary processor can be a low power processor having lower power consumption than an application processor in one or more embodiments. For example, in one embodiment the application processor is tasked with performing the secure information and application operating functions of an electronic device. Accordingly, the application processor will consume relatively large amounts of power. By contrast, the secondary processor may perform a limited number of non-secure functions. Thus, the secondary processor can be configured as a smaller component that consumes less power than an application processor. Fingerprint sensors in accordance with embodiments of the disclosure can be configured to work with either device, referred to herein as an "auxiliary" processor.

Embodiments of the disclosure contemplate that power savings—and thus longer runtime on a single battery charge—can be achieved by causing the auxiliary processor to enter a low power or sleep mode when not in use. However, in one or more embodiments the fingerprint sensor can remain in an operational state continually, even while the device is not in use. To reduce overall latency, in one or more embodiments the finger print sensor can capture fingerprint data and perform at least one pre-processing step on that data. In one or more embodiments, the pre-pressing steps can occur while the auxiliary processor is in the low power or sleep mode. However, embodiments of the disclosure contemplate that data matching systems will become more complex. For example, algorithms matching fingerprint data to reference data to determine whether there is a match will become increasingly sophisticated and will require more calculations. Accordingly, to reduce latency, embodiments of the disclosure contemplate that it is best to have the auxiliary processor perform the matching function. At the same time, to conserve power embodiments of the disclosure perform essentially all pre-processing fingerprint data functions in the fingerprint sensor itself while the auxiliary processor is in the low-power or sleep mode. The auxiliary processor can then awaken to perform the matching steps of the fingerprint verification process.

Embodiments of the disclosure contemplate that latency will be large when a user uses a fingerprint sensor to both authenticate the user's identity and wake the overall device by waking the auxiliary processor. Auxiliary processors, especially when configured as application processors, take time to wake from a low power or sleep mode. As this is true, fingerprint data received at the fingerprint sensor generally cannot be acquired or analyzed during this wake state. Where this time is long enough, a user may lift their finger from the fingerprint sensor prior to any fingerprint data being captured at all.

Embodiments of the disclosure provide a solution to this predicament by sharing the labor between processing components in—or operable with—the fingerprint sensor and the auxiliary processor itself. For example, in one embodiment the auxiliary processor is operable to arm the fingerprint sensor prior to the auxiliary processor entering a low power or sleep mode. While the auxiliary processor is in the low power or sleep mode, the fingerprint sensor can be operable to detect a finger proximately located with the fingerprint sensor. The fingerprint sensor can optionally, in one embodiment, determine whether an object in contact with the fingerprint sensor is actually a finger or another object.

In one embodiment, the fingerprint sensor can then capture and store fingerprint data from the finger. The fingerprint sensor can further perform at least one pre-processing step while the auxiliary processor is in the low power or sleep mode in one or more embodiments. Illustrating by example, in one application the fingerprint data can be stored for a limited duration. Accordingly, the at least one pre-processing step can comprise initiation by the fingerprint sensor of a timer after capturing fingerprint data. When the timer expires, the fingerprint sensor may delete the fingerprint data. Where the user lifts their finger and again touches the fingerprint sensor while the timer has not expired, the fingerprint sensor may capture another image of the figure, i.e., acquire second fingerprint data, and compare it with the initial fingerprint data to determine which data is of higher quality.

When the auxiliary processor awakens, be it from a power button press or other interrupt device, the auxiliary processor can then poll the fingerprint sensor to determine whether fingerprint data has been captured. In one embodiment, this occurs after the pre-processing step of the fingerprint sensor is complete. Where it has, the auxiliary processor can retrieve the fingerprint data from the fingerprint sensor and compare the fingerprint data to reference data to determine whether the fingerprint data substantially matches the reference data.

Thus, in a fingerprint matching algorithm, the "up front" work of capturing, recapturing, and pre-processing data can be done by the fingerprint sensor while the auxiliary processor is in—or waking from—the low power or sleep mode. The auxiliary processor can then perform the matching steps of the process to determine if the user is authorized to use the device. This "capture while the auxiliary processor is asleep or waking and then match on the auxiliary processor" two-step process both reduces latency in the fingerprint analysis and works to eliminate failing to capture fingerprint data when a user quickly lifts their finger as noted above.

Advantageously, embodiments of the disclosure work to reduce an amount of data that needs to be transferred from the fingerprint sensor to the auxiliary processor by performing pre-processing steps in the fingerprint sensor while the auxiliary processor is asleep. Additionally, embodiments of the disclosure allow the fingerprint sensor—acting in concert with processors in, or operable with, the fingerprint sensor—to do as much of the fingerprint identification algorithm in parallel with the waking of the auxiliary processor as possible while leaving the matching step for the auxiliary processor. Embodiments of the disclosure thus allow the auxiliary processor to stay in the low power or sleep mode as much as possible to conserve power and increase device runtime.

In one or more embodiments, the fingerprint sensor performs operations such as determining whether an object proximately located with the fingerprint sensor is a finger, fingerprint data capture, data quality comparisons, noise filtering, and so forth. This results in reliable fingerprint data being ready for the auxiliary processor when it wakes from the low power or sleep mode.

Embodiments of the disclosure contemplate that the auxiliary processor can awaken from the low power or sleep mode at various times. For example, in one embodiment, the auxiliary processor awakens when an object determined by the fingerprint sensor to be a finger is detected. In another embodiment, the auxiliary processor awakens when fingerprint data is being captured. In another embodiment, the auxiliary processor awakens after fingerprint data is captured. In yet another embodiment, the auxiliary processor awakens in response to an interrupt event, such as that created when a user presses a power button on the electronic device.

To provide minimum latency across each of the wake times described in the preceding paragraph, in one or more embodiments the fingerprint sensor is configured to retain fingerprint data at least for a predetermined time. This is true regardless of whether the user's finger leaves the fingerprint sensor prior to the auxiliary processor waking. This minimum duration of fingerprint data retention provides the auxiliary processor with a sufficient time to exit the low power or sleep mode.

However, in one or more embodiments the amount of time the fingerprint data is retained needs to be limited for security reasons. Users may not want their fingerprint data stored in a device indefinitely. Accordingly, in one embodiment the fingerprint sensor is configured to initiate a timer upon capturing the fingerprint data from the finger. The fingerprint sensor can then delete the fingerprint data upon expiration of the timer. In one embodiment, this happens regardless of whether the auxiliary processor has sufficiently awoken and/or requested the fingerprint data from the fingerprint sensor.

Embodiments of the disclosure contemplate that when such a timer is in use, the user may lift their finger from the fingerprint sensor and then touch it again. This "double touch" can happen prior to expiration of the timer. Advantageously, in one embodiment the fingerprint sensor retains the first fingerprint data for a sufficiently long duration to be able to capture second fingerprint data. The fingerprint sensor can then compare the first fingerprint data to the second fingerprint data and determine which of the first fingerprint data or the second fingerprint data is more representative of the finger, i.e., is of higher quality for use in a matching algorithm. In one embodiment, the fingerprint sensor can then delete which of the first fingerprint data or the second fingerprint data is less representative of the finger. This results in the fingerprint sensor retaining an image or other fingerprint data that has the superior quality and that has the better chance of a successful match to the reference data.

In one or more embodiments, one or more state input/output lines can be coupled between the fingerprint sensor and the auxiliary processor. As will be described in more detail below, where included these state input/output lines can be used as inputs to the fingerprint sensor at times and outputs from the fingerprint sensor at other times. Use of these state input/output lines advantageously allows the auxiliary processor to interrupt the fingerprint sensor at some times, and also allows the fingerprint sensor to notify the auxiliary processor that it is acquiring—or has captured—fingerprint data in one or more embodiments. This notification can be used, for example, to wake the auxiliary processor from its low power or sleep mode in one embodiment. Other applications for the state input/output lines will be described below. Still others will be obvious to those of ordinary skill in the art having the benefit of this disclosure.

Turning now to FIG. 1, illustrated therein is one explanatory system 100 configured in accordance with one or more embodiments of the disclosure. The system 100 includes an explanatory electronic device 101 in this embodiment. The explanatory electronic device 101 of FIG. 1 is shown as a smart phone for illustrative purposes. However, it should be obvious to those of ordinary skill in the art having the benefit of this disclosure that other electronic devices may be substituted for the explanatory smart phone to achieve the system 100 of FIG. 1. For example, a system 100 configured in accordance with embodiments of the disclosure could substitute a palm-top computer, a tablet computer, a gaming device, wearable computer, a media player, or other device for the smart phone that is used for illustrative purposes in FIG. 1.

This illustrative electronic device 101 includes a display 102, which may optionally be touch-sensitive. In one embodiment where the display 102 is touch-sensitive, the display 102 can serve as a primary user interface of the electronic device 101. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

In one embodiment, the display 102 is a high-resolution display. The term "high-resolution display" is used herein to refer to a display device that can present text and images to a user by altering a large number of pixels which, when viewed collectively by a user, form the presented text or image. The high-resolution display can be used for the presentation of text, information, and graphics on a mobile device with sufficient granularity as to be easily switched between graphics or text. For example, the high-resolution display could be one suitable for presenting an image in the Joint Photographics Expert Group (JPG) format to the user. Such displays generally are configured to turn on and off individual pixels by way of a display driver for the presentation of high-resolution information.

The explanatory electronic device 101 of FIG. 1 includes two housing members. A front housing member 127 is disposed about the periphery of the display 102. Said differently, the display 102 is disposed along a major face of the front housing member 127 in one embodiment. A rear-housing member 128 forms the backside of the electronic device 101 in this illustrative embodiment. Features can be incorporated into the housing members 127,128. Examples of such features include an optional camera 111 or an optional speaker port 114, which are show disposed on the backside of the electronic device 101 in this embodiment. In this illustrative embodiment, a fingerprint sensor 110 is disposed along the rear-housing member 128 on the backside of the electronic device 101. Note that in other embodiments, the fingerprint sensor 110 could be disposed along the front housing member 127 adjacent to the display 102 as well. In still other embodiments, the fingerprint sensor 110 could be disposed beneath the display 102, thereby allowing the user to place a finger on the display 102 for identification.

In one embodiment, the fingerprint sensor 110 can be a single function device. In other embodiments, the fingerprint sensor 110 can be a dual or multifunction device. Illustrating by example, in one embodiment the fingerprint sensor 110 is solely responsible for receiving biometric data from a user and either authenticating the user or determining that the user is unauthorized to use the electronic device 101. This would be a single function fingerprint sensor.

In other embodiments, the fingerprint sensor 110 may be capable of performing multiple functions. Again illustrating by example, in one embodiment the fingerprint sensor 110 can receive biometric data from a user and either authenticate the user or determine that the user is unauthorized to use the electronic device 101. However, the fingerprint sensor 110 may also be configured as a push button. Thus, by touching the fingerprint sensor 110 the user may deliver biometric data only. However, by touching and pressing the fingerprint sensor 110, the fingerprint sensor 110 may both authenticate the user by receiving the biometric data from touch input and perform a second function in response to the push button being depressed. An example of the second function may be causing the auxiliary processor 116 to exit a low power or sleep mode.

Where the fingerprint sensor 110 is instead a single function device, another user control, such as push button 109, may be included for performing the second function. Thus, in such an embodiment the user may touch the fingerprint sensor 110 to deliver biometric data and press the push button 109 or other user control to cause the auxiliary processor 116 to exit the low power or sleep mode. In one or more embodiments, simultaneous activation of the fingerprint sensor 110 and the push button 109 may be required. For example, a user may have to press the push button 109 with one finger while touching the fingerprint sensor 110 with another finger to access all operational features of the electronic device 101. In other embodiments, these processes, i.e., touching the fingerprint sensor 110 and pressing the push button 109, may need to be performed in a specific order to properly unlock the electronic device 101 and access the features of the auxiliary processor 116. In still other embodiments, no particular order of these processes may be required so long as both are performed within a predetermined time of each other. Other modes of unlocking an accessing the electronic device 101 will be obvious to those of ordinary skill in the art having the benefit of this disclosure.

In one embodiment, the electronic device 101 includes one or more connectors 112, 113, which can include an analog connector, a digital connector, or combinations thereof. In this illustrative embodiment, connector 112 is an analog connector disposed on a first edge, i.e., the top edge, of the electronic device 101, while connector 113 is a digital connector disposed on a second edge opposite the first edge, which is the bottom edge in this embodiment.

A block diagram schematic 115 of the electronic device 101 is also shown in FIG. 1. In one embodiment, the electronic device 101 includes one or more control circuits. In one embodiment, the electronic device includes an auxiliary processor 116. The auxiliary processor 116 can include one or more processors. The auxiliary processor 116 can be a microprocessor, a group of processing components, one or more Application Specific Integrated Circuits (ASICs), programmable logic, or other type of processing device. The auxiliary processor 116 can be operable with the various components of the electronic device 101. The auxiliary processor 116 can be configured to process and execute executable software code to perform the various functions of the electronic device 101. A storage device, such as memory 118, can optionally store the executable software code used by the auxiliary processor 116 during operation.

In this illustrative embodiment, the electronic device 101 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, and other networks. The communication circuit 125 can include wireless communication circuitry, one of a receiver, a transmitter, or transceiver, and one or more antennas 126.

The fingerprint sensor 110 is operable with the auxiliary processor 116 in one or more embodiments. In one embodiment, the fingerprint sensor 110 includes its own processor 127 to perform various functions, including detecting a finger proximately located with the fingerprint sensor 110, capturing and storing fingerprint data from the finger, performing at least one pre-processing step while the auxiliary processor 116 is in a low power or sleep mode, and upon receiving a request from the auxiliary processor 116 for the fingerprint data, delivering the fingerprint data to the auxiliary processor 116. In one or more embodiments the processor 127 of the fingerprint sensor 110 can, as one pre-processing step, initiate a timer upon capturing the fingerprint data from the finger and can delete the fingerprint data upon expiration of the timer. In one embodiment, the processor 127 of the fingerprint sensor 110 can, as another pre-processing step, detect removal and replacement of the finger on the fingerprint sensor 110, and where the timer has not expired, capture second fingerprint data from the fingerprint sensor 110. The processor 127 of the fingerprint sensor 110 can then compare the fingerprint data to the second fingerprint data to determine which of the fingerprint data or the second fingerprint data is more representative of the user's finger. The processor 127 of the fingerprint sensor 110 can then delete which of the fingerprint data or the second fingerprint data is less representative of the finger.

The processor 127 of the fingerprint sensor 110 can be an on-board processor. Alternatively, the processor 127 can be a secondary processor that is external to, but operable with, the fingerprint sensor in another embodiment. Other configurations will be obvious to those of ordinary skill in the art having the benefit of this disclosure.

In one embodiment, the fingerprint sensor 110 can include an array of pixels. The fingerprint sensor 110 can be a complementary metal-oxide-semiconductor active pixel sensor digital imager or any other fingerprint sensor. The fingerprint sensor 110 can be configured to capture a live scan of a fingerprint pattern from a finger disposed along its surface, and to store this information as fingerprint data from the user's finger. The fingerprint sensor 110 may also be able to capture one or more images. The images can correspond to an area beneath a surface of skin. The fingerprint sensor 110 can compare the fingerprint data or skin images to one or more references to authenticate a user in an authentication process.

In one embodiment, the auxiliary processor 116 can be configured as an application processor responsible for performing the primary functions of the electronic device 101. For example, in one embodiment the auxiliary processor 116 comprises one or more circuits operable to present presentation information, such as images, text, and video, on the display 102. The executable software code used by the auxiliary processor 116 can be configured as one or more modules 120 that are operable with the auxiliary processor 116. Such modules 120 can store instructions, control algorithms, and so forth.

In one embodiment where the auxiliary processor 116 is configured as an application processor, the auxiliary processor 116 can be responsible for running the operating system environment 121. The operating system environment 121 can include a kernel, one or more drivers 122, and an application service layer 123, and an application layer 124. The operating system environment 121 can be configured as executable code operating on one or more processors or control circuits of the electronic device 101.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 101, an electronic mail application 105 configured to send and receive electronic mail, a photo application 106 configured to permit the user to view images or video on the display 102 of electronic device 101, and a camera application 107 configured to capture still (and optionally video) images. These applications are illustrative only, as others will be obvious to one of ordinary skill in the art having the benefit of this disclosure.

In one or more embodiments where the auxiliary processor 116 is configured as an application processor, the auxiliary processor 116 is responsible for managing the applications and all secure information of the electronic device 101. Secure information can include personal information that is revealed only to authorized users upon authentication by the fingerprint sensor 110. The auxiliary processor 116 is also responsible for launching, monitoring and killing the various applications and the various application service modules. The applications of the application layer 124 can be configured as clients of the application service layer 123 to communicate with services through application program interfaces (APIs), messages, events, or other inter-process communication interfaces.

In one or more embodiments, the auxiliary processor 116 can be configured as a secondary processor that is operable with an application processor. Where so configured, the auxiliary processor 116 can be tasked with executing non-secure or non-application operations. For example, the auxiliary processor 116 may execute input/output functions, actuate user feedback devices, and so forth. In one embodiment the auxiliary processor 116 is not permitted execute any operations involving personal information that is revealed only to authorized users upon authentication by the fingerprint sensor 110.

In one or more embodiments, the auxiliary processor 116 can be placed into a low power or sleep mode when the electronic device 101 is not in use. When the auxiliary processor 116 is in the low power or sleep mode, the display 102 may be OFF and the various applications will not be operational.

By contrast, in one or more embodiments the fingerprint sensor 110 may be left in a continually operational mode. Said differently, in one or more embodiments the fingerprint sensor 110 is to operate in an operational mode while the auxiliary processor 116 is in the low power or sleep mode. As the fingerprint sensor 110 and its associated processor 127 consume relatively low power, this may provide advantages such as quicker response times when a user begins, for example, interacting with the fingerprint sensor 110 or other components of the electronic device 101.

In one embodiment, the auxiliary processor 116 is operable to arm the fingerprint sensor 110 prior to the auxiliary processor 116 entering the low power or sleep mode. For example, when the electronic device 101 is unlocked and operational, there may be little or no need for biometric authentication via the fingerprint sensor 110. Accordingly, the auxiliary processor 116 may disarm the fingerprint sensor 110. Where the fingerprint sensor 110 is a dual or multifunction device, secondary or other functionality may remain operational when the fingerprint sensor 110 is disarmed. For instance, a user may still be able to press the push button of the dual action fingerprint sensor to take a photograph. However, in many instances when the auxiliary processor 116 enters the low power or sleep mode, it may lock the electronic device 101 so that it is not accessible. Accordingly, in one or more embodiments the auxiliary processor 116 arms and/or activates the fingerprint sensor 110 prior to entering the low power or sleep mode.

In one or more embodiments, one or more state input/output lines 128 are coupled between the fingerprint sensor 110 and the auxiliary processor 116. The inclusion of the one or more state input/output lines 128 is optional, as shown by comparing FIGS. 3 and 6 below.

In one embodiment, the one or more state input/output lines 128 can be interchangeably converted between functioning as outputs from the fingerprint sensor 110 to the auxiliary processor 116 and functioning as outputs from the auxiliary processor 116 to the fingerprint sensor 110. Accordingly, state information can be exchanged between the fingerprint sensor 110 to the auxiliary processor 116 in the form of a state input/output defined by two general-purpose input/output state lines, namely a first general-purpose state input/output line 129 and a second general-purpose input/output state line 130. The fingerprint sensor 110 and the auxiliary processor 116 can exchange general-purpose input/output information via the first general-purpose state input/output line 129 and the second general-purpose input/output state line 130 to general-purpose input/output connections at each device. The state input/output can change in accordance with one of many methods, one of which will be described in more detail below with reference to FIG. 7.

In the illustrative embodiment of FIG. 1, two general-purpose state input/output lines 129,130 are used with a state diagram (described below with reference to FIG. 8). It should be noted that these two general-purpose state input/output lines 129,130 are used to illustrate one explanatory communication path between the fingerprint sensor 110 and the auxiliary processor 116. Moreover, the states of the state diagram discussed below with reference to FIG. 8 illustrate explanatory states that are useful in practice. For designers desiring alternate functions, other communication interfaces may be substituted for the two general-purpose state input/output lines 129,130. Illustrating by example, a designer may substitute a one-wire bus, two-wire bus, or other communication interface so that a secure, encrypted channel is established between the fingerprint sensor 110 and the auxiliary processor 116. Other communication interfaces will be obvious to those of ordinary skill in the art having the benefit of this disclosure.

Figure 2:
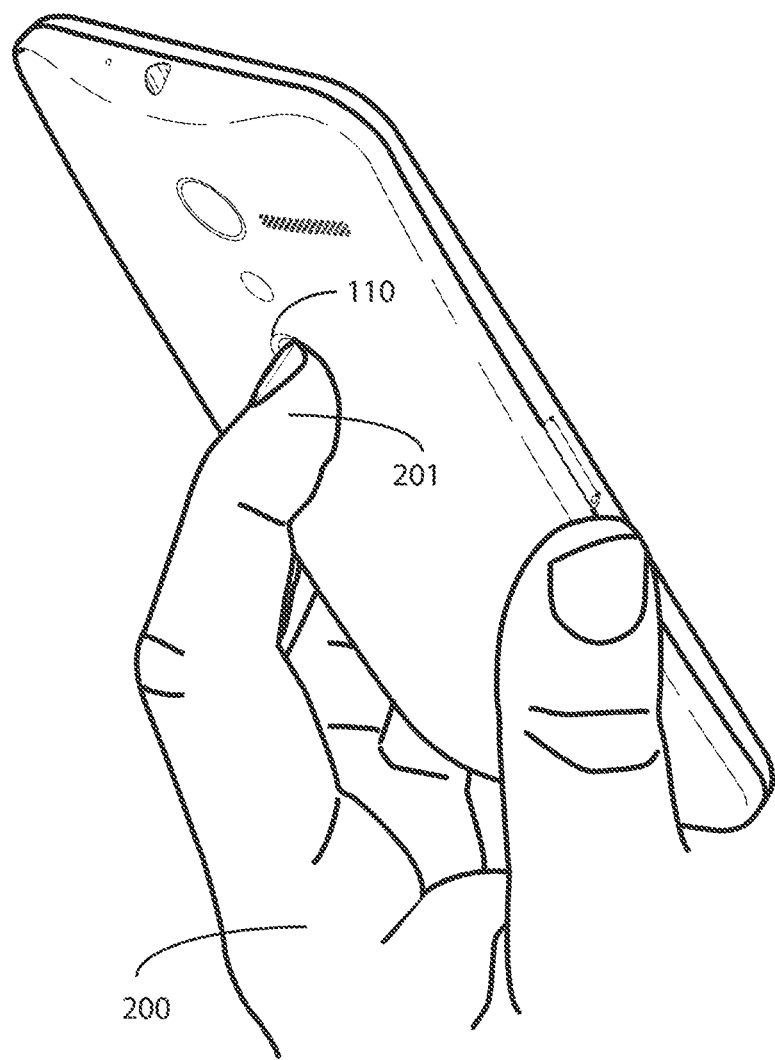
FIG. 2 illustrates a user using one explanatory system configured in accordance with one or more embodiments of the disclosure.

Turning to FIG. 2, a user 200 is using the fingerprint sensor 110 by proximately locating a finger 201 with the fingerprint sensor 110. The fingerprint sensor 110 is then configured to detect the finger 201 being proximately located with the fingerprint sensor 110. The fingerprint sensor 110 then captures and stores fingerprint data from the finger 201. In one embodiment, the fingerprint data comprises an image of the user's fingerprint. Other examples of fingerprint data will be obvious to those of ordinary skill in the art having the benefit of this disclosure.

Where the fingerprint sensor 110 is also be configured as a push button, it may perform a second function in response to being depressed. An example of the second function may be causing the auxiliary processor (116) to exit a low power or sleep mode.

Figure 3:
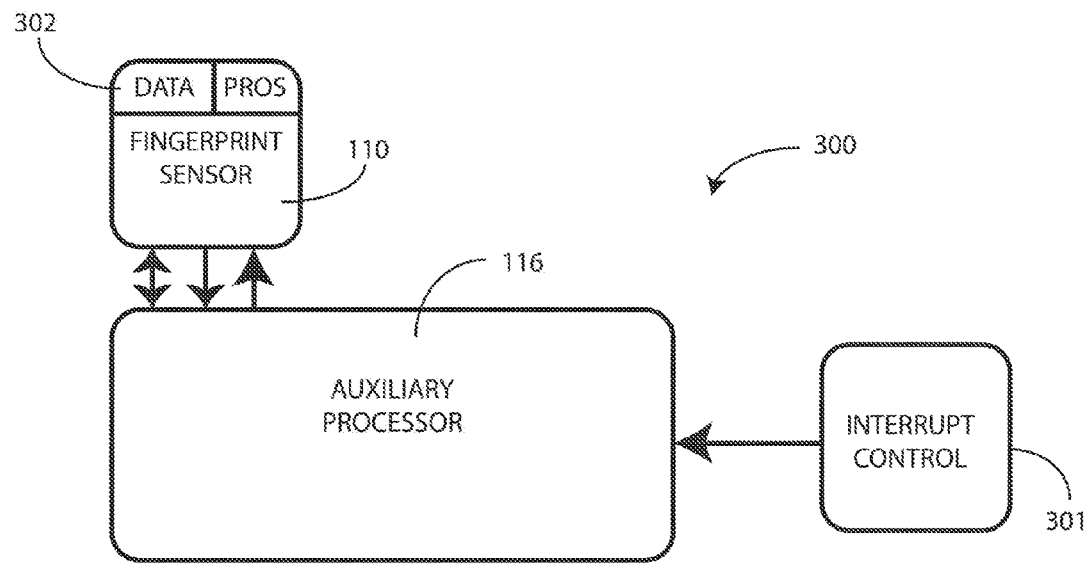
FIG. 3 illustrates one explanatory schematic block diagram associated with one or more embodiments of the disclosure.

Turning now to FIG. 3, illustrated therein is a schematic block diagram of the front end 300 of one explanatory system in accordance with one or more embodiments of the disclosure. This particular front end 300 includes the fingerprint sensor 110 and the auxiliary processor 116. The fingerprint sensor 110 is to capture and store fingerprint data 302 from a user's finger (201).

An interrupt control 301 can optionally also be operable with the auxiliary processor 116. The interrupt control 301, where included, can be triggered in one of a variety of ways. For example, where the fingerprint sensor 110 is capable of performing multiple functions, the interrupt control 301 may be responsive to touching and pressing of the fingerprint sensor 110. Alternatively, where the fingerprint sensor 110 is instead a single function device, the interrupt control 301 may be responsive to another user control, such as push button (109) from FIG. 1. Other modes of actuating the interrupt control 301 will be obvious to those of ordinary skill in the art having the benefit of this disclosure.

When the interrupt control 301 is actuated, in one embodiment the auxiliary processor 116 exits the low power or sleep mode. When this happens, several additional actions can occur. In one embodiment, the auxiliary processor 116 is permits any authentication process occurring in the fingerprint sensor 110 to complete. In another embodiment, the auxiliary processor 116 is to interrupt the authentication process occurring in the fingerprint sensor 110 upon exiting the low power or sleep mode. In yet another embodiment, the auxiliary processor 116 can reset the authentication process of the fingerprint sensor 110 after exiting the low power or sleep mode. In yet another embodiment, the auxiliary processor 116 can request the fingerprint data 302 from the fingerprint sensor 110 upon exiting the low power or sleep mode in response to the actuation of the interrupt control 301. Other actions will be obvious to those of ordinary skill in the art having the benefit of this disclosure.

In one embodiment, both the fingerprint sensor 110 is to operate in a mode that is semi-autonomous from the auxiliary processor 116 at substantial, or all, times. This semi-autonomous operation works to provide a real-time, "always ON" responsiveness of the fingerprint sensor 110 by allowing the fingerprint sensor 110 to collect and pre-process fingerprint data while the auxiliary processor 116 exits the low power or sleep mode.

Figure 4:
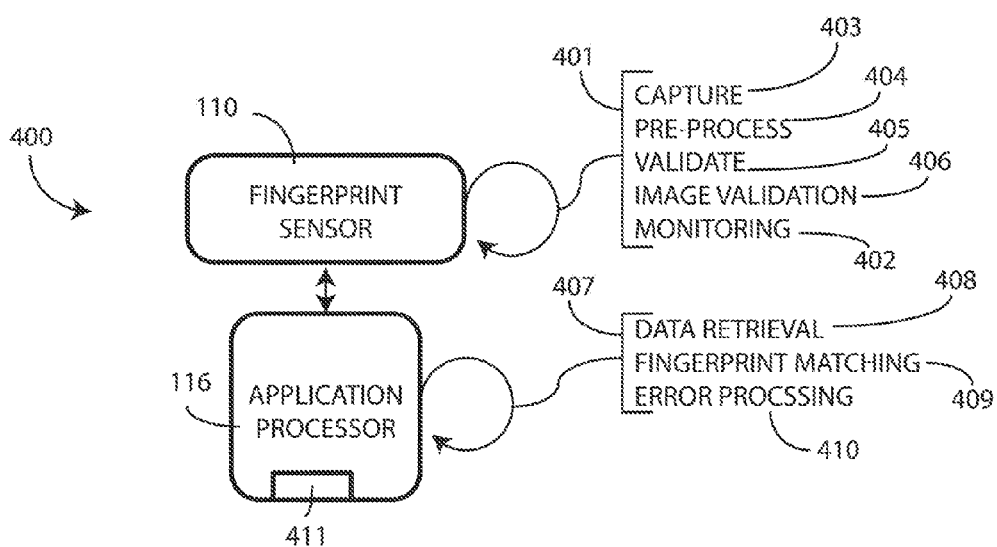
FIG. 4 illustrates one explanatory functional schematic block diagram in accordance with one or more embodiments of the disclosure.

Turning now to FIG. 4, illustrated therein is a functional diagram 400 indicating which functions occur where when the fingerprint sensor 110 is operating in a semi-autonomous mode of operation relative to the auxiliary processor 116 in one or more embodiments. The fingerprint sensor 110 performs capturing and pre-processing steps 401, while the auxiliary processor 116 performs matching and control steps 407. Examples of capturing and pre-processing steps 401 include monitoring 402 the fingerprint sensor to detect a finger proximately located with the fingerprint sensor 110 and capturing 403 fingerprint data (302). The capturing and pre-processing steps 401 can also include pre-processing 403 the fingerprint data (302), e.g., noise filtering the fingerprint data (302) or other pre-processing steps as described herein.

The capturing and pre-processing steps 401 can further include validating 405 whether an object proximately located with the fingerprint sensor 110 is actually a finger rather than another inanimate object such as a key ring, lipstick case, or other object. The capturing and pre-processing steps 401 can also include image validation 405. The image validation 405 can include determining if the fingerprint data (302) is of sufficient quality so as to successfully make it through the matching and control steps 407 occurring in the auxiliary processor 116. In other embodiments, where multiple sets of the fingerprint data (302) exists, the image validation 405 can include comparing the second object or fingerprint data (302) to primary object or fingerprint data (302) and deleting a lesser quality one of the second object or fingerprint data (302) and the primary object or fingerprint data (302).

The auxiliary processor 116, in one embodiment, is then tasked with executing the matching and control steps 407. In one embodiment, the matching and control steps 407 comprise retrieving 408 the fingerprint data (302) from the fingerprint sensor 110. For example, the auxiliary processor 116 may request, by polling or other means, the fingerprint data (302) from the fingerprint sensor 110. Upon receiving a request from the auxiliary processor 116 for the fingerprint data (302), the fingerprint sensor 110 can deliver the fingerprint data (302) to the auxiliary processor 116 in one or more embodiments.

The matching and control steps 407 can further include performing 409 a fingerprint matching operation. In one embodiment, this includes comparing the fingerprint data (302) to reference data 411 and determining whether the fingerprint data (302) substantially matches the reference data 411. In another embodiment, this includes comparing object data taken from an object proximately located to the fingerprint sensor 110 to reference data and determining whether the object data substantially matches the reference data.

The matching and control steps 407 can further include error processing 410. It is contemplated that the fingerprint sensor 110, for whatever reason, may occasionally enter an error state requiring the fingerprint sensor 110 to be reset, recalibrated, or otherwise addressed. Illustrating by example, the auxiliary processor may need to have a service module communicate with the executable code operating in the fingerprint sensor 110. While this is expected to rarely, and preferably never, happen, if it does occur the matching and control steps 407 can be used to correct this state. One reason the error state can occur, for example, is when the fingerprint sensor 110 is in need of calibration to properly capture and store the fingerprint data (302). Accordingly, the auxiliary processor 116 can then perform a recalibration process as part of the matching and control steps 407.

Figure 5:
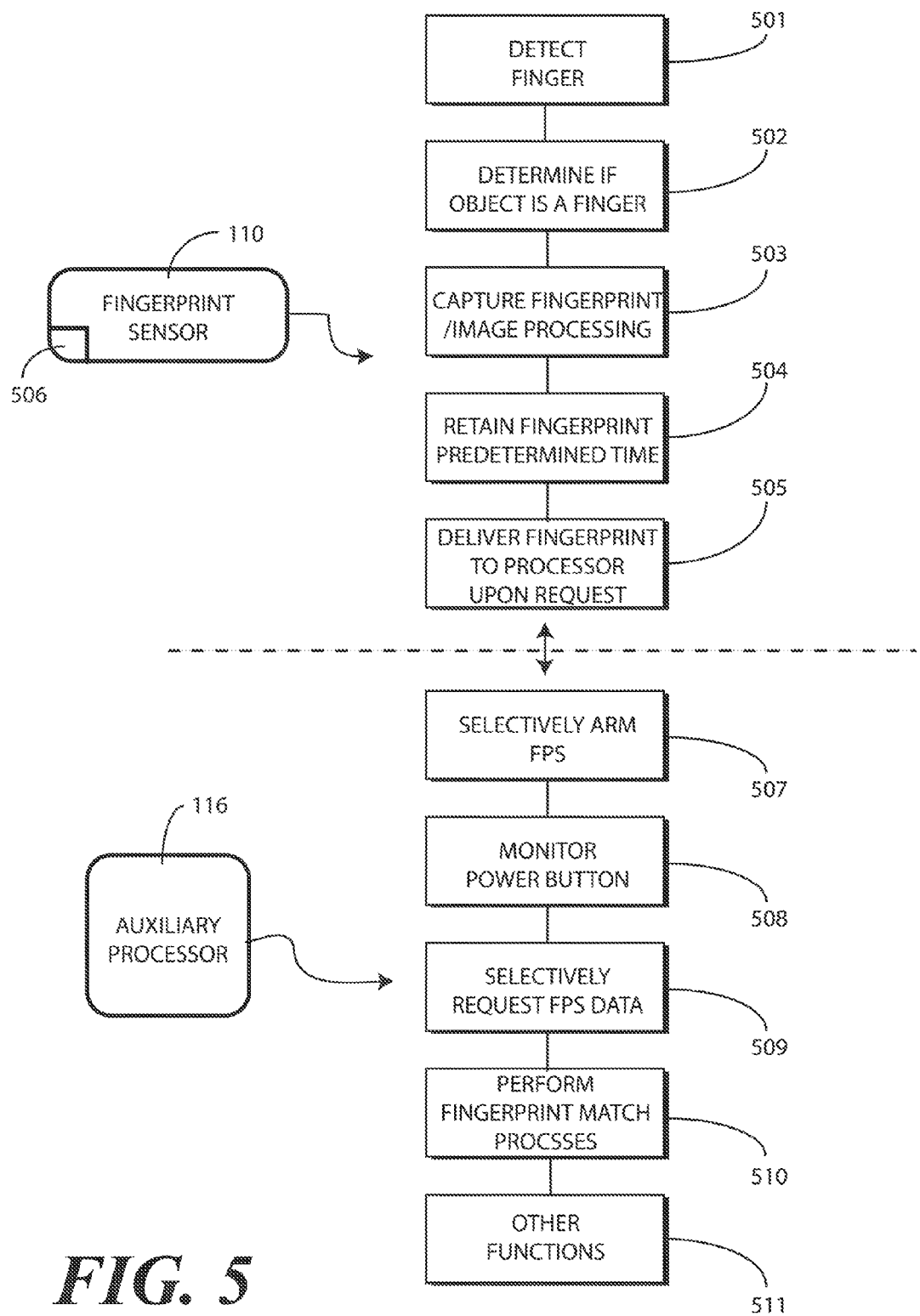
FIG. 5 illustrates one explanatory method associated with one or more embodiments of the disclosure.

Turning now to FIG. 5, illustrated therein is a more detailed delineation of various functions that can occur when the fingerprint sensor 110 is operating in a semi-autonomous mode relative to the auxiliary processor 116. In one embodiment, the fingerprint sensor 110 is to detect 501 a finger proximately located with the fingerprint sensor 110. As a part of the detection process, the fingerprint sensor 110 can enter an input reception mode upon an object contacting the surface of the fingerprint sensor 110.

In one embodiment, the fingerprint sensor 110 can optionally be configured to determine 502—with a reasonable amount of certainty—that the object touching or otherwise proximately located with the fingerprint sensor 110 is actually a finger and not an object incapable of authentication. Where the object is a finger, the fingerprint sensor 110 can then capture 503 fingerprint data from the finger and perform other pre-processing such as noise filtering and so forth.

In one or more embodiments, the fingerprint sensor 110 is further to retain 504 the fingerprint data for at least a predetermined time. For example, in one embodiment the fingerprint sensor 110 can initiate a timer 506 upon capturing 503 the fingerprint data and can retain the fingerprint data while the timer is active. In one embodiment, the fingerprint sensor 110 can then delete the fingerprint data upon expiration of the timer 506. In one embodiment, upon receiving a request from the auxiliary processor 116 for the fingerprint data, the fingerprint sensor 110 can deliver 505 the fingerprint data to the auxiliary processor 116.

The auxiliary processor 116 can then perform certain matching and control functions. For example, in one embodiment the auxiliary processor 116 operable to arm 507 the fingerprint sensor 110 prior to the auxiliary processor 116 entering a low power or sleep mode. The auxiliary processor 116 can then exit 508 the low power or sleep mode when a push button (109) is actuated by a user. In one or more embodiments, upon exiting the low power or sleep mode, the auxiliary processor 116 requests 509 fingerprint data from the fingerprint sensor 110. Upon receiving this request 509 for the fingerprint data, the fingerprint sensor 110 can deliver 505 the fingerprint data to the auxiliary processor 116.

The auxiliary processor 116, after having received the fingerprint data, can then perform a matching process 510 to determine whether the fingerprint data substantially matches reference data stored in memory. Other functions 510 can be performed by the auxiliary processor 116 as well.

Thus, when operating in the semi-autonomous mode of FIG. 5, as much fingerprint data processing as possible is done on the fingerprint sensor 110. This may include algorithms such as a "real finger" check, frame selection, noise filtering, etc. The result this processing is a high quality fingerprint data set that is transmitted to the auxiliary processor 116 to be run through the matching process 510.

For improved usability, in one or more embodiments the fingerprint sensor 110 retains 504 the fingerprint data such that it is available for the auxiliary processor 116 to use in the matching process 510 for some fixed time after the fingerprint data is captured 503, regardless if the user has already removed their finger. This provides the auxiliary processor 116 sufficient time to wake up if it is in the low power or sleep mode. It may also be desirable for security reasons to eventually delete the fingerprint data whether the auxiliary processor 116 has requested it or not. Therefore, a timeout is provided in one or more embodiments.

Also it is possible that the user could touch the fingerprint sensor 110, remove their finger, and then touch the fingerprint sensor 110 again before the timeout has expired. In this case it can be preferable for the fingerprint sensor 110 to retain the first fingerprint data long enough to compare it with second fingerprint data to decide which has the superior quality. The fingerprint sensor 110 can then retain the one of the fingerprint data or the second fingerprint data that has the better chance of a successful match during the matching process 510 occurring in the auxiliary processor 116.

It should be noted that there are situations where it is possible for the fingerprint sensor 110 to come in contact with a conductive surface, but where it is contextually unlikely for the user to be attempting to authenticate. For example, if the overall electronic device is in a docking station or holster, there may be a small probability that the user is attempting to use the fingerprint sensor 110. In some applications, the auxiliary processor 116 is in a better position t understand these contextual relationships. Accordingly, in one embodiment the other functions 511 include the ability for the auxiliary processor 116 to interrupt the fingerprint sensor 110. For example, the entire semi-autonomous mode may be halted as one of the other functions 511 so that the fingerprint sensor 110 can be placed into a low power state.

Figure 6:
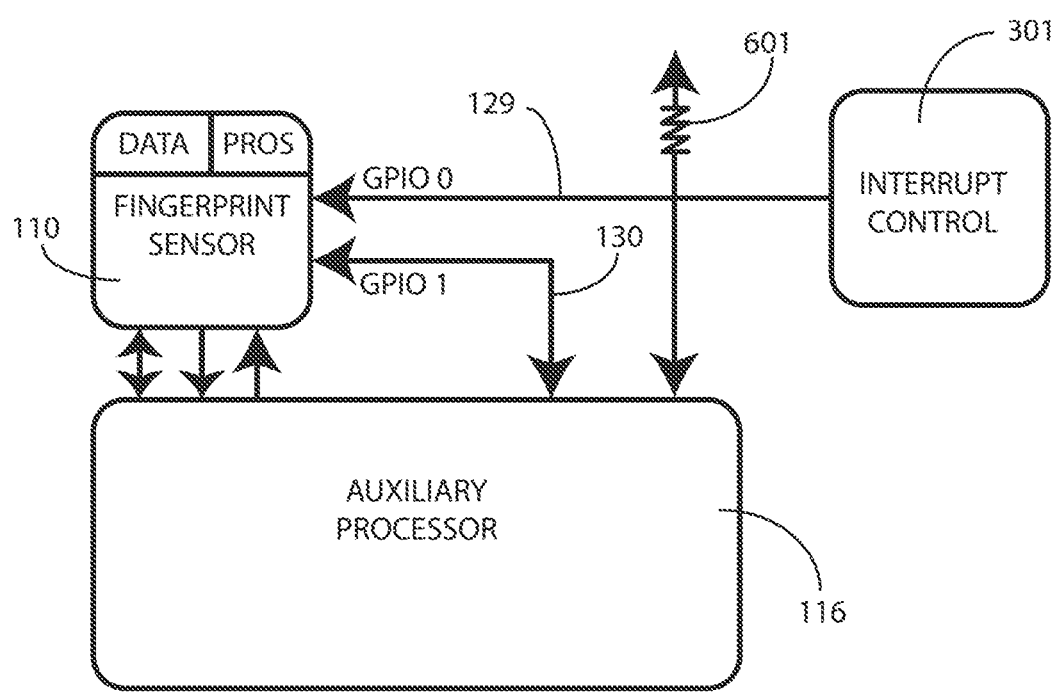
FIG. 6 illustrates another explanatory schematic block diagram associated with one or more embodiments of the disclosure.

Turning now to FIG. 6, illustrated therein is an alternate schematic block diagram of another front end 600 of one explanatory system in accordance with one or more embodiments of the disclosure. This alternate front end 600 includes the fingerprint sensor 110 and the auxiliary processor 116. The fingerprint sensor 110 is to capture and store fingerprint data 302 from a user's finger (201). This front end 600 further comprises two state input/output lines 129,130 coupled between the fingerprint sensor 110 and the auxiliary processor.

An interrupt control 301 is also operable with the auxiliary processor 116. In this illustrative embodiment, the interrupt control 301 is coupled to a first state input/output line 129. The second state input/output line 130 is for communication between the auxiliary processor 116 and the fingerprint sensor 110. In one embodiment, the interrupt control 301 comprises a power button or push button that can be triggered or otherwise actuated by a user. In one or more embodiments, when the interrupt control 301 is actuated, the auxiliary processor 116 is to exit the low power or sleep mode.

When this happens, several additional actions can occur. In one embodiment, the auxiliary processor 116 permits any authentication process occurring in the fingerprint sensor 110 to complete. In another embodiment, the auxiliary processor 116 is to interrupt the authentication process occurring in the fingerprint sensor 110 upon exiting the low power or sleep mode. In yet another embodiment, the auxiliary processor 116 can reset the authentication process of the fingerprint sensor 110 after exiting the low power or sleep mode. In yet another embodiment, the auxiliary processor 116 can request fingerprint data from the fingerprint sensor 110 upon exiting the low power or sleep mode. Other actions will obvious to those of ordinary skill in the art having the benefit of this disclosure.

Information can be exchanged between the fingerprint sensor 110 and the auxiliary processor 116 along the two general purpose state input/output lines 129,130. The information exchanged along these state input/output lines 129,130 can change in accordance with one of many methods, one of which will be described in more detail with reference to FIG. 7.

In the embodiment of FIG. 6, two general purpose state input/output lines 129,130 are used with state diagram described below with reference to FIG. 8. It should be again noted that these two general purpose state input/output lines 129,130 are used to illustrate one explanatory communication path between the fingerprint sensor 110 and the auxiliary processor 116. Moreover, the states of the state diagram discussed below with reference to FIG. 8 illustrate explanatory states that are useful in practice.

In one embodiment, state input/output line 130 is used to signal state changes. However, it can also be used to issue a HALT command in one or more embodiments. For example, if the auxiliary processor 116 pulls state input/output line 130 low while the fingerprint sensor 110 is detecting a finger or capturing fingerprint data, in one embodiment the fingerprint sensor suspends its semi-autonomous operation and returns to an idle state. The fingerprint sensor 110 then waits in the idle state until the auxiliary processor 116 releases state input/output line 130. Accordingly, in one embodiment state input/output line 130 provides a communication link allowing the auxiliary processor 116 to terminate the semi-autonomous operation of the fingerprint sensor 110 and to disarm the fingerprint sensor by keeping state/input line 130 low. (Note that low could be high by reversing the logic.)

In this illustrative embodiment, state input/output line 129 is tied to the interrupt control 301. As a pull-up resistor 601 retains state input/output line 129 high, actuation of the interrupt control 301 causes state input/output line 129 to go low. (Again, low could be high in reverse logic.) This causes the auxiliary processor 116 to exit the low power or sleep mode in one embodiment. This also can alert the fingerprint sensor 110 that the auxiliary processor is booting and may soon request fingerprint data from the fingerprint sensor 110.

In one or more embodiments, the auxiliary processor 116 arms the fingerprint sensor 110 prior to entering the low power or sleep mode. This causes the fingerprint sensor 110 to enter an idle mode in one or more embodiments. When the fingerprint sensor 110 enters the idle mode, state input/output line 130 is allowed to float high through a pull-up resistor (not shown). The fingerprint sensor 110 then internally configures the pin or terminal coupled to state input/output line 130 as an interrupt that is triggered on a falling edge (or rising edge if reverse logic is used).

The fingerprint sensor 110 then monitors to detect an object proximately located with the fingerprint sensor 110. In one embodiment, when an object touches or otherwise becomes proximately located with the fingerprint sensor, the fingerprint sensor 110 is to determine whether the object is likely to be a finger. If this determination fails, the fingerprint sensor 110 can then wait for the object to leave the fingerprint sensor. Accordingly, the fingerprint sensor 110 configures state input/output line 130 as an input while detecting the finger proximately located with the fingerprint sensor 110.

If this determination passes, i.e., the object is likely to be a finger, the fingerprint sensor 110 converts the pin or terminal coupled to state input/output line 130 to an output. The fingerprint sensor 110 then pulls state input/output line 130 low to signal to the auxiliary processor that the capture of fingerprint data is occurring. While state input/output line 130 is low, other capturing and pre-processing steps (401) described above as well.

Once the fingerprint data has been captured and at least one pre-processing step has been performed, in one embodiment the fingerprint sensor 110 enters a loop where it monitors to determine if any of three actions occurs: 1) actuation of a power button or other interrupt control by a user of the electronic device; 2) a new object contacting or becoming proximately located with the fingerprint sensor 110; or if any timer initiated by the fingerprint sensor 110 has expired. If actuation of the power button or a new object contacting or becoming proximately located with the fingerprint sensor 110 occurs, the fingerprint sensor determines whether an amount of time remaining in the timer is sufficient for the auxiliary processor 116 to exit the low power or sleep mode. If there is, then the fingerprint data is deleted and new fingerprint data is captured. If not, then second fingerprint data is captured and the best quality one of the fingerprint data or the second fingerprint data is maintained. If the timer has expired when the power button actuation event or the new object contacting or becoming proximately located with the fingerprint sensor 110 occurs, the fingerprint sensor deletes any stored fingerprint data and returns to the idle mode. This allows state input/output line 130 to again float high.

A summary of the states and configurations described above is shown in FIG. 8. Turning now briefly to FIG. 8, illustrated therein are three tables 801,802,803. Table 801 illustrates how the pins or terminals coupled to the state input/output lines 129,130 are configured during various operations. Table 802 illustrates how state input/output line 130 is used when the pin or terminal coupled to this state input/output line 130 in the fingerprint sensor (110) is configured as an output. Table 803 illustrates how state input/output line 130 is used when the pin or terminal coupled to this state input/output line 130 in the fingerprint sensor (110) is configured as an input. These tables 801,802,803 reflect the functional description set forth in the preceding five paragraphs. In each of these tables 801,802,803 it should be again noted that the logic could be reversed without departing from the spirit and scope of the disclosure.

As shown in table 801, since state input/output line 129 is tied to the interrupt control (301), it is configured as an input to both the fingerprint sensor (110) and the auxiliary processor (116). When the fingerprint sensor (110) is idle, or when the fingerprint sensor (110) is determining whether an object proximately located with the fingerprint sensor (110) is likely to be a finger, known as the "acquiring" mode, the pin or terminal coupled to state input/output line 130 is configured as an input. At the auxiliary processor (116) the corresponding pin can be configured as an output when the auxiliary processor (116) desires to HALT or interrupt the fingerprint sensor (110). Otherwise, it is an input as well.

When the pin or terminal of the fingerprint sensor (110) coupled to state input/output line 130 is configured as an input, as shown in table 802, the fingerprint sensor (110) allows state input/output line 130 to float high when in either the idle mode or when determining whether an object proximately located with the fingerprint sensor (110) is one requiring authentication. By contrast, when the fingerprint sensor (110) is capturing fingerprint data or performing one or more pre-processing steps, state input/output line 130 is pulled low.

When the pin or terminal of the fingerprint sensor (110) coupled to state input/output line 130 is configured as an output, as shown in table 803, the fingerprint sensor (110) will run in its semi-autonomous loop when the state input/output lines 129,130 are low. When the interrupt control (301) is actuated, causing state input/output line 129 to go high, but state input/output line 130 is low, the fingerprint sensor will determine whether an amount of time remaining in a timer is sufficient for the auxiliary processor (116) to exit the low power or sleep mode. If there is, then the fingerprint data is deleted and new fingerprint data is captured. If not, then second fingerprint data is captured and the best quality one of the fingerprint data or the second fingerprint data is maintained. Actuation of the interrupt control (301) can also cause the auxiliary processor (116) to exit the low power or sleep mode as well in one or more embodiments.

If state input/output line 130 is pulled high by the auxiliary processor (116), the semi-autonomous mode of the fingerprint sensor (110) is halted. In one embodiment, the fingerprint sensor (110) then deletes any stored fingerprint data and returns to the idle mode. This allows state input/output line 130 to again float high.

As illustrated in the tables 801,802,803 of FIG. 8, when a system includes one or more state input/output lines coupled between the fingerprint sensor (110) and the auxiliary processor (116), the following can occur: First, the fingerprint sensor (110) can configure the one or more state input/output lines as an output during capturing fingerprint data from the finger and can pull such line low. Where this occurs, the fingerprint sensor (110) can deliver a state output to the auxiliary processor (116) during capturing of fingerprint data from a finger. As previously described, in one embodiment the fingerprint sensor (110) can then monitor for a power button or interrupt control event after delivering the state output, or alternatively can monitor for another object proximately located with the fingerprint sensor, i.e., another "finger down" event, after delivering the state output.

Second, the fingerprint sensor (110) can configure the one or more state input/output lines as an input while detecting the finger proximately located with the fingerprint sensor (110) or determining whether an object proximately located with the fingerprint sensor (110) is likely to be a finger, and can allow such line to float high. At this point, the auxiliary processor (116) can deliver a state output to the fingerprint sensor (110) on the one or more state input/output lines to interrupt the fingerprint sensor, cause a HALT, or optionally return the fingerprint sensor (110) to an idle mode of operation and/or cause the fingerprint sensor (110) to delete the fingerprint data.

Figure 7:
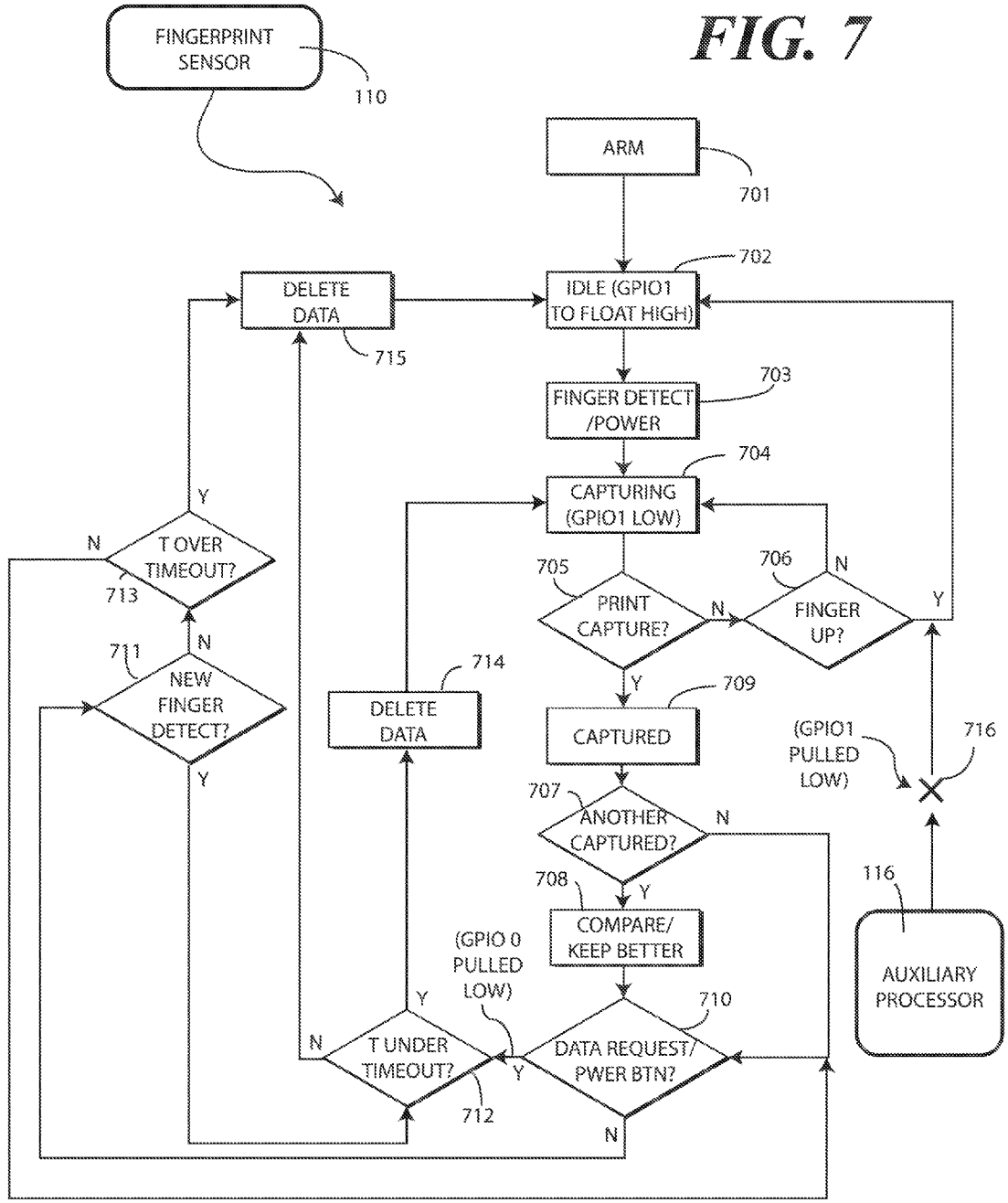
FIG. 7 illustrates another explanatory method associated with one or more embodiments of the disclosure.

Turning now to FIG. 7, illustrated therein is a method 700 of some of these steps. At step 701, an auxiliary processor 116 arms a fingerprint sensor 110 prior to entering a low power or sleep mode. At step 701, the auxiliary processor 116 then enters the low power or sleep mode.

At step 702, the fingerprint sensor 110 enters an idle state. Where a state input/output line is coupled between the fingerprint sensor 110 and the auxiliary processor 116, in one embodiment step 702 allows the state input/output line to float high. Step 702 can also include the fingerprint sensor 110 configuring a pin or terminal coupled to the state input/output line as an input to be triggered as an interrupt on a falling edge.

At step 703, the fingerprint sensor 110 checks to see whether a conductive object is touching the fingerprint sensor 110. Optionally, step 703 can also include the fingerprint sensor 110 determining whether the conductive object is likely to be a finger.

At step 704, the fingerprint sensor 110 begins acquiring fingerprint data. In one embodiment, where a state input/output line is coupled between the fingerprint sensor 110 and the auxiliary processor 116, step 704 can also include converting the pin or terminal of the fingerprint sensor 110 coupled to the state input/output line to an output and pulling that line low to notify the auxiliary processor 116 that data capture is occurring.

Decision 705 determines whether the fingerprint data being captured at step 704 was successfully captured. If it was not, the method 700 either returns to step 704 or step 702, depending upon whether the finger was lifted as determined at decision 706.

In one or more embodiments, the fingerprint sensor 110 is to initiate a timer upon capturing the fingerprint data from the finger, and to detect removal and replacement of the finger on the fingerprint sensor 110. Where the timer has not expired and replacement of the finger has occurred, the fingerprint sensor 110 can capture second fingerprint data from the finger. Whether this occurs is determined at decision 707. Where it has, step 708 can include a comparison of the fingerprint data to the second fingerprint data, a determination of which of the fingerprint data or the second fingerprint data is more representative of the finger, and a deletion of which of the fingerprint data or the second fingerprint data is less representative of the finger.

Once step 709, or optionally step 708 when a second image is captured, is complete, the fingerprint sensor 110 enters a loop where it monitors to determine if any of three actions occurs: 1) a power button or other interrupt actuation event in the electronic device, as determined at decision 710; 2) a new object contacting or becoming proximately located with the fingerprint sensor 110, as determined at decision 711; or if any timer initiated by the fingerprint sensor 110 has expired, as determined at decisions 712,713.

If a power button or interrupt control actuation event or a new object contacting or becoming proximately located with the fingerprint sensor 110 occurs as determined at either decision 710 or decision 711, the fingerprint sensor 110 determines whether an amount of time remaining in the timer is sufficient for the auxiliary processor 116 to exit the low power or sleep mode. The latter determination occurs at decision 712. If there is, then the fingerprint data is deleted at step 714 and new fingerprint data is captured at step 704. If not, then second fingerprint data is captured and the best quality one of the fingerprint data or the second fingerprint data is maintained via decision 707 and step 708. If the timer has expired when the power button or interrupt control actuation event or the new object contacting or becoming proximately located with the fingerprint sensor 110 occurs, as determined at decision 713, the fingerprint sensor 110 deletes any stored fingerprint data at step 715 and return to the idle mode at step 702. This allows the state input/output line to again float high.

It should be noted that the auxiliary processor 116 can, at any time, awaken from the low power or sleep mode and issue an interrupt 716 to the fingerprint sensor. The interrupt 716 can cause the fingerprint sensor to deliver fingerprint data to the auxiliary processor for matching operations, return the fingerprint sensor to the idle mode, or perform other operations.

Accordingly, the method 700 of FIG. 7 provides a method in a fingerprint sensor 110 operable with an auxiliary processor 116. The fingerprint sensor 110 can enter an armed mode, detect an object contacting a surface of the fingerprint sensor 110 while the auxiliary processor 116 is in a low power or sleep mode, capturing object data from the object, perform one or more pre-processing functions on the object data, receive a request from the object data from the auxiliary processor 116, and delivering the object data to the auxiliary processor 116. As previously described, the auxiliary processor 116 can then compare the object data to reference data and determine whether the object data substantially matches the reference data to authenticate the object.

The method 700 of FIG. 7 also provides, in the fingerprint sensor 110, initiating a timer, retaining the object data prior to expiration of the timer, and deleting the object data after expiration of the timer. The method 700 also provides, in the fingerprint sensor 110, configuring an input/output line as an input during the detecting and the capturing. The method 700 also provides, in the fingerprint sensor 110, converting the input/output line to an output after the capturing. The method 700 optionally provides, in the fingerprint sensor capturing second object data from the object, comparing the second object data to the object data, and deleting a lesser quality one of the second object data and the object data.

Figure 9:
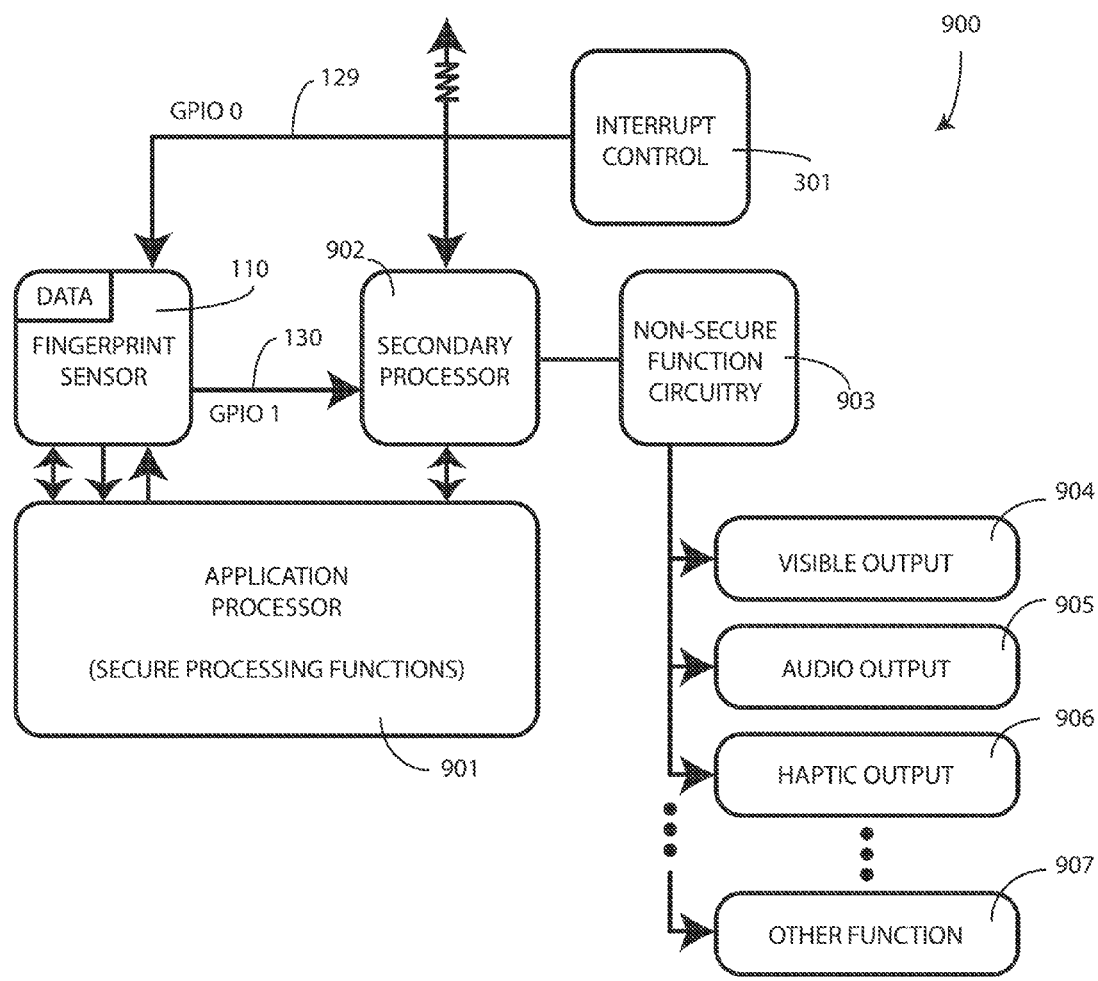
FIG. 9 illustrates another explanatory schematic block diagram associated with one or more embodiments of the disclosure.

Turning now to FIG. 9, illustrated therein is yet another schematic block diagram of yet another front end 900 of one explanatory system in accordance with one or more embodiments of the disclosure. This alternate front end 900 includes the fingerprint sensor as before. The fingerprint sensor 110 is to capture and store fingerprint data from a user's finger. This front end 800 further comprises two state input/output lines 129,130. Rather than being coupled to a single auxiliary processor as before, the two state input/output lines 129,130 are coupled to a secondary processor 902. The secondary processor 902 works in tandem with the fingerprint sensor 110 and the other processor, which is an application processor 901 in this embodiment.

The secondary processor 902 may optionally be operable with non-secure function circuitry 903 to control one or more functions, including actuation of a visible output 904, actuation of an audio output 905, actuation of a haptic or tactile output 906 that a user can feel, or actuation of another function 907. Alternatively, the secondary processor 902 may actuate or control the one or more functions directly in other embodiments.

In one embodiment, the application processor 901 is responsible for performing the primary functions of the electronic device into which the front end 900 is disposed. In one embodiment, the application processor 901 is responsible for running the operating system environment. In one or more embodiments, the application processor 901 is responsible for managing the applications and all secure information of the electronic device into which the front end 900 is disposed. The application processor 901 is also responsible for launching, monitoring and killing the various applications and the various application service modules.

In one or more embodiments, the secondary processor 902 is tasked with executing non-secure or non-application operations. For example, the secondary processor 902 may execute input/output functions, actuate user feedback devices, and so forth.

In one or more embodiments, as it tasked with many more operations to manage, the application processor 901 consumes more power than does the secondary processor 902 on an average basis when operating normally under an average load. For example, in ordinary operation the application processor 901 may consume on the order of tens of Watts or more when running applications or communicating voice or other data, while the secondary processor 902 may only consume on the order of less than a Watt in its normal operation. Accordingly, in one or more embodiments the secondary processor 902 will consume less power than the application processor 901 when both the secondary processor 902 and the application processor 901 are operational. In some situations, the application processor 901 can consume an order or magnitude or more power than the secondary processor 902.

The operation of the fingerprint sensor 110 can be as before. However, the state input/output lines 129,130 can interface with the secondary processor 902 rather than the application processor 901. This configuration can be preferred because it allows the application processor 901 to remain in the low power or sleep mode for as long as possible while the secondary processor 902 performs contextual processing steps. As the secondary processor 902 is a lower power processor, and is keeping track of context, it can allow the application processor 901 to remain in the low power or sleep mode until the matching steps (407) are required. The secondary processor 902 can inform the fingerprint sensor 110 when go to the idle mode of operation and when to run normally.

Advantageously, one or more embodiments of the disclosure employ the secondary processor 902 to work with the fingerprint sensor 110 while leaving the application processor 901 in the low power or sleep mode for longer periods of time. This solution works to conserve overall power usage in an electronic device by utilizing the secondary processor 902 to provide contextual functionality while leaving the application processor 901 in a low power state.

The difference in power consumption can result in different operational characteristics for each processor. For example, in one or more embodiments the application processor 901 can be placed into a low power or sleep mode when the electronic device into which the front end 900 is disposed is not in use. By contrast, in one or more embodiments the secondary processor 902 may be left in a continually operational mode. As the secondary processor 902 consumes relatively low power, this may provide advantages such as quicker response times when a user begins, for example, interacting with the fingerprint sensor 110 or other components of the electronic device into which the front end 900 is disposed.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A system, comprising:
   a fingerprint sensor;
   an application processor operable to enter a low power or sleep mode; and
   a secondary processor operable to arm the fingerprint sensor;
   the fingerprint sensor to:
     detect a finger proximately located with the fingerprint sensor;
     capture and store fingerprint data from the finger;
     perform at least one pre-processing step after capturing the fingerprint data from the finger while the application processor is in the low power or sleep mode; and
     after the at least one pre-processing step and upon receiving a request from the application processor for the fingerprint data deliver the fingerprint data to the application processor; and
   the application processor to:
     compare the fingerprint data to reference data; and
     determine whether the fingerprint data substantially matches the reference data.

2. The system of claim 1, the at least one pre-processing step comprising:
   initiation of a timer upon capturing the fingerprint data from the finger; and
   deletion of the fingerprint data upon expiration of the timer.

3. The system of claim 1, the at least one pre-processing step comprising:
   initiation of a timer upon capturing the fingerprint data from the finger;
   detection of removal and replacement of the finger on the fingerprint sensor; and
   where the timer has not expired, capture of second fingerprint data from the finger.

4. The system of claim 3, the at least one pre-processing step further comprising:
   a comparison of the fingerprint data to the second fingerprint data;
   determination of which of the fingerprint data or the second fingerprint data is more representative of the finger; and
   deletion of which of the fingerprint data or the second fingerprint data is less representative of the finger.

5. The system of claim 1, further comprising one or more state input/output lines coupled between the fingerprint sensor and the secondary processor.

6. The system of claim 5, the fingerprint sensor to configure the one or more state input/output lines as an output during capturing the fingerprint data from the finger.

7. The system of claim 6, the fingerprint sensor to deliver a state output to the application processor during the capturing of the fingerprint data from the finger.

8. The system of claim 7, the fingerprint sensor to monitor for a power button or interrupt control actuation event after delivering the state output.

9. The system of claim 7, the fingerprint sensor to monitor for another object proximately located with the fingerprint sensor after delivering the state output.

10. The system of claim 5, the fingerprint sensor to configure the one or more state input/output lines as an input while detecting the finger proximately located with the fingerprint sensor.

11. The system of claim 10, the secondary processor to deliver a state output to the fingerprint sensor on the one or more state input/output lines to interrupt the fingerprint sensor.

12. The system of claim 11, the state output to cause the fingerprint sensor to return to an idle mode of operation.

13. The system of claim 11, the state output to cause the fingerprint sensor to delete the fingerprint data.

14. The system of claim 1, further comprising an interrupt control to cause the application processor to exit the low power or sleep mode in response to actuation of the interrupt control.

15. The system of claim 1, the secondary processor comprising a lower power processor than the application processor.

16. A method, comprising:
in a fingerprint sensor operable with a secondary processor and an application processor:
entering an armed mode based on an instruction from the secondary processor;
remaining in the armed mode while the application processor is in a low power or sleep mode;
detecting an object contacting a surface of the fingerprint sensor while the application processor is in the low power or sleep mode;
capturing object data from the object;
performing at least one pre-processing step while the application processor is in the low power or sleep mode;
receiving a request from the object data from the application processor after the application processor exits the low power or sleep mode;
delivering the object data to the application processor; and
entering a disarmed mode based on an instruction from the secondary processor; and
in the application processor, after exiting the low power or sleep mode:
comparing the object data to reference data; and
determining whether the object data substantially matches the reference data.

17. The method of claim 16, the performing at least one pre-processing step comprising initiating a timer, retaining the object data prior to expiration of the timer, and deleting the object data after expiration of the timer.

18. The method of claim 17, the performing at least one pre-processing step comprising configuring an input/output line as an input during the detecting and the capturing.

19. The method of claim 18, further comprising, converting the input/output line to an output after the capturing.

20. The method of claim 16, the performing at least one pre-processing step comprising:
capturing second object data from the object;
comparing the second object data to the object data; and
deleting a lesser quality one of the second object data and the object data.

* * * * *